INVENTOR.
CHARLES F. SIMMERS

Jan. 26, 1965     C. F. SIMMERS     3,167,332
ROTATING JOINT FOR WATER COOLED TRUNNION
Filed Dec. 12, 1962     4 Sheets-Sheet 3

INVENTOR.
CHARLES F. SIMMERS
BY
ATTORNEYS

INVENTOR.
CHARLES F. SIMMERS

United States Patent Office 3,167,332
Patented Jan. 26, 1965

3,167,332
ROTATING JOINT FOR WATER COOLED TRUNNION
Charles F. Simmers, Canfield, Ohio, assignor to The Morgan Engineering Co., Alliance, Ohio, a corporation of Ohio
Filed Dec. 12, 1962, Ser. No. 244,061
8 Claims. (Cl. 285—41)

My invention relates to the cooling of trunnions on and bearings for converters for the making of steel or on other similar vessels wherein a large quantity of heat is generated. The specific problem which my invention solves is that of cooling a trunnion, its journal and bearing, which has no readily accessible open end to which a conventional cooling system may be attached.

The problem of cooling converter bearings and trunnions in general is unlike the problem of cooling most other rotating shafts. The effect of heat generated by friction in the bearings for the trunnions is very small since the converter is being tilted back and forth for an average time of only about five minutes per hour while in operation, but the heat flowing into the trunnion from the vessel is great and forever tends to freeze or bind the trunnion journals in the bearings and immobilize the vessel unless the heat is removed rapidly enough.

Where both trunnions of the converter have end faces which are easily accessible, the problem of cooling them is solved with reasonable ease. A hole may be bored in the center of the trunnion, and fluid circulating pipes carrying cooling fluid may be inserted into the hole and connected to a source and waste of cooling fluid through known swivel connectors. This is and would be the case in steel making converters where the bull gear is fitted over the trunnion next to the bearing support, leaving the end face of the trunnion uncovered and accessible.

The problem pinches where the bull gear is attached to the trunnion by means of a large, end-encompassing coupling, which conceals and covers completely the part of the trunnion which extends beyond the bearing support, including the end face of the trunnion, and prevents employment of conventional swivel-joint piping on the end face of the trunnion.

An object of my invention is to solve the problems stated above, and to provide a cooling system for the trunnion of a converter, or other tiltable heating vessel, which has no readily accessible end face.

A further object of my invention is to provide a trunnion cooling system wherein an elongated pipe for disposition in the center of the trunnion may be easily inserted and thereafter withdrawn for cleaning purposes without having to remove the heavy part of the coupling which is secured to and covers the end of the trunnion.

Another object of my invention is to provide a trunnion cooling system which may be constructed and assembled easily, and which will demand a minimum of construction and maintenance costs.

Another object is to provide a safe and leak-proof liquid or water cooling system for a converter trunnion appropriate for use in the presence of great heat and molten slag and metal.

Another object is to provide a trunnion cooling system in which the wearing and sealing and fluid connecting parts are readily accessible, inspectable, repairable and renewable.

Other objects and advantages of my invention will appear more fully from the following description of a preferred form thereof, reference being had to the accompanying drawings in which.

Figure 1:
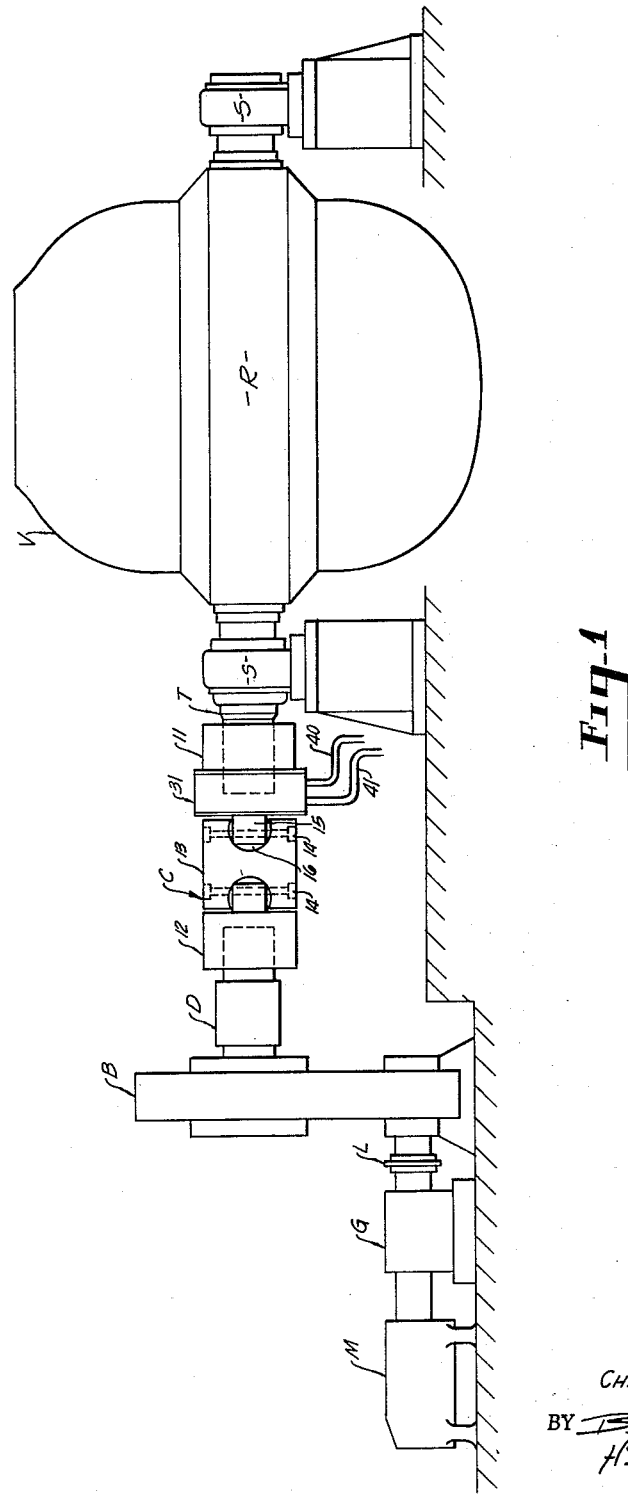
FIGURE 1 is a partly diagrammatic side elevation of a converter and its drive with a coupling and trunnion embodying my cooling system.

Referring to FIG. 1, the general layout in which my invention is used includes a converter or heating vessel V, rotatably mounted in bearings carried on pillars and on supports S by means of trunnions journalled in the bearings. Attached to the end of one of the trunnions T is the driving coupling C, comprising three main coupling members: right (as viewed) end member 11 attached securely to a trunnion member T; left end member 12, attached securely to drive shaft D; and middle coupling member 13 movably and removably attached to members 11 and 12 by means of removable pins 14, shown in dotted lines. Coupling C, as shown and described herein, is illustrative of the several conventional kinds and types of couplings known to those skilled in the art, all of which posed the problem that my invention has solved. Motor M acting through gear box G, clutch L, bull gear B, drive shaft D, coupling C and trunnion T tilts and positions the vessel V as desired.

Figure 2:
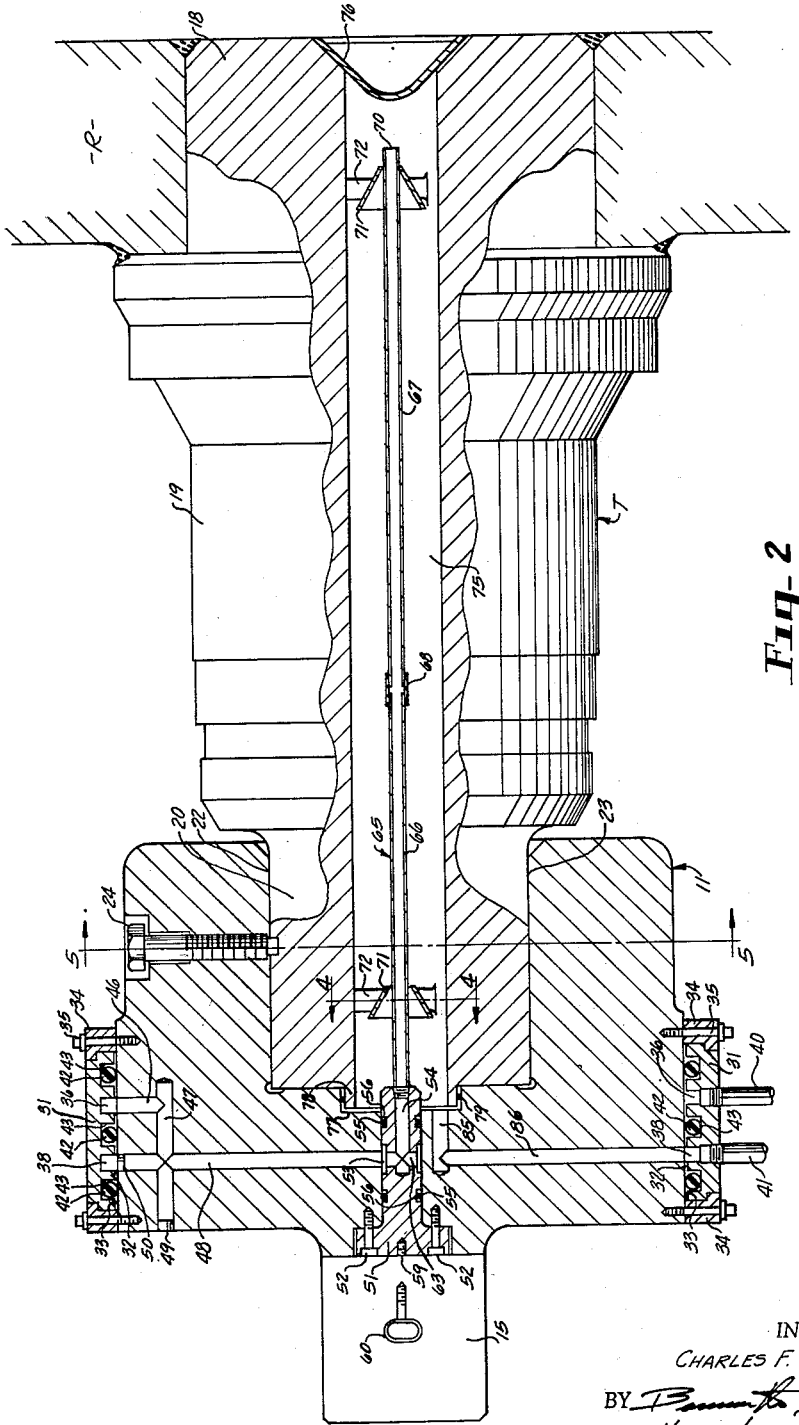
FIGURE 2 is a longitudinal section and partial side elevation of the trunnion and a member of the coupling, which is attached thereto but detached from the rest of the coupling, and showing my cooling system in detail.
Figure 3:
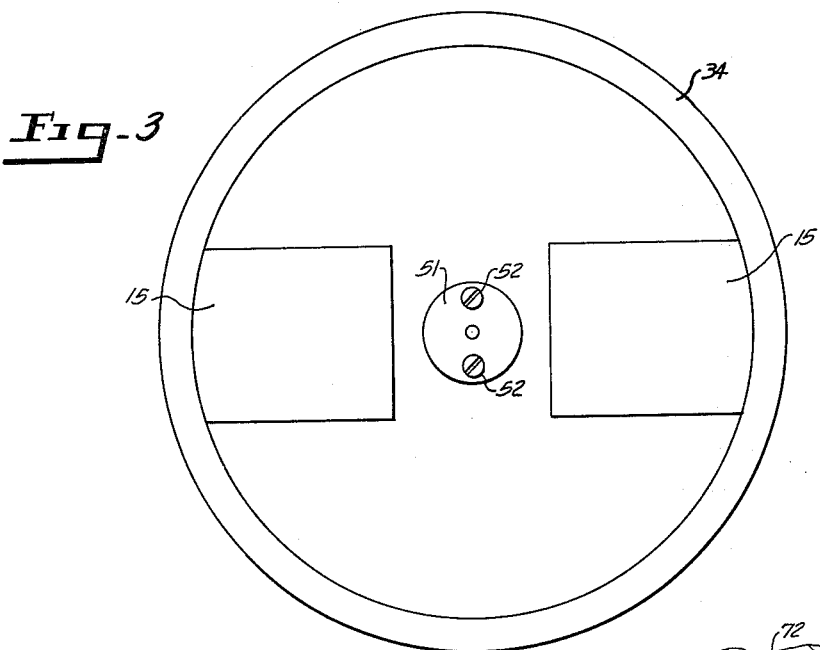
FIGURE 3 is a left, as viewed, end elevation of the coupling member in FIG. 2.

Coupling member 11 has on its left (as viewed) end face two spades 15, FIGS. 2 and 3, which fit into the rightward end of the great transverse slots 16 of coupling member 13. Pins 14 extend between spades 15 and with their attendant bearing pads and bushings attach the coupling members together in a known manner for proper driving and flexible connection.

Figure 5:
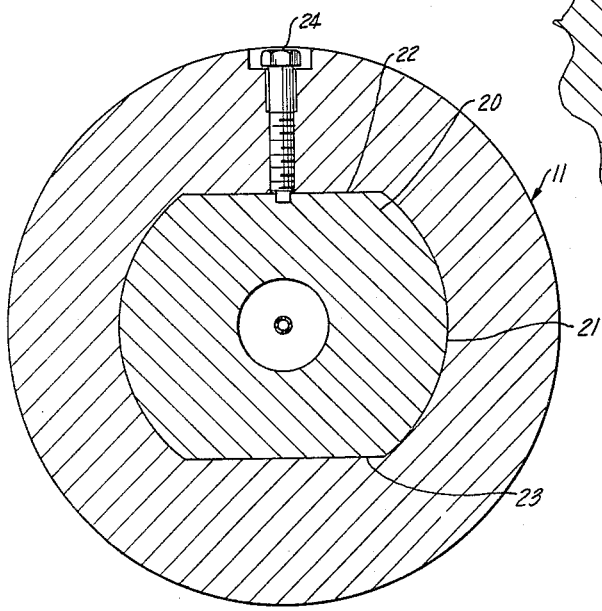
FIGURE 5 is a cross-sectional view of the coupling member and trunnion taken along line 5—5 of FIG. 2.

Referring to FIG. 2 trunnion member T consists of an inward end portion 18 secured in the converter ring R, a journal portion 19 and an outward coupling engaging portion 20. Coupling member 11 fits over the end portion 20 of the trunnion T, and as shown in FIG. 5, the cylindrical interface 21 between these two parts is interrupted at its top and bottom by two planar interfaces 22 and 23, and no rotary motion of one part relative to the other part is allowed. Bolt 24 inserted from the top of coupling member 11 into a hole in portion 20 of trunnion T at interface 22 secures coupling member 11 to trunnion T preventing axial sliding between these two parts in a known manner.

To cool the trunnion, I cause cooling fluid to be introduced to and exhausted from the central internal bore 75 in the trunnion, FIG. 2, by stationary external pipes 40 and 41, respectively, see also FIG. 1, by way of the stationary ring 31 which slidably encompasses the coupling member 11 and directs incoming cooling fluid from the pipe 40 through appropriate passages in the coupling member to the pipe 65 in the bore 75 and from the bore to the outlet pipe 41. Preferably the pipe 65 extends well into the hottest part of the trunnion in the inward end portion 18 thereof where the bore is closed by a closure plate 76 preferably welded therein, and thereby brings cool fluid to the innermost end of the bore whence it returns through the bore, taking heat from the whole length of the trunnion, to the discharge pipe 41 via, inter alia, exhaust passages 85 and 86 in the coupling member 11.

As shown in FIG. 2 the ring 31 has five internal annular grooves or channels facing the coupling member; the outer and middle grooves 43 containing, preferably, rubber or rubber-like O-ring fluid seals 42 which segregates intermediate grooves 36 and 38 so that groove 36 may comprise an exclusive, axially-sealed-off passage for cool, incoming cooling fluid, and groove 38 may comprise a like exclusive passage for outgoing heated fluid. The ring 31 has free sliding clearance with coupling member; the ring's composite internal, smooth, circular, cylindrical surface 32 being juxtaposed to and slightly larger than the external, smooth, circular, cylindrical surface 33 formed on the coupling for sliding and sealing coaction with the seals 42. Ring 31 may be held against rotation by any convenient means including, for example, the intake and exhaust pipes 40 and 41. Ring 31 is conveniently retained axially on the coupling member 11 by retaining rings 34 freely slidably engaging opposite ends of the ring and being attached to the coupling member by screws 35.

Preferably the fits between the ring 31 and the inner surfaces of the ring and the smoothed surface 33 of the coupling are free enough that the fluid seals 42 tend to center and support the ring on and about coupling member, and provide, being wetted by the cooling fluid which is preferably water, a fine low-friction bearing for the ring upon the coupling member.

Inlet pipe 40 taps into inlet groove 36 of ring 31, conveniently at the bottom of the ring as shown in FIG. 2 and the groove, in turn, opens to the radially drilled passage 46, shown at the top of the coupling in FIG. 2 which, via communicating passages 47 and 48, leads the cooling fluid to the block 51 which is removably disposed in the center of the coupling member 11 between the spades 15, FIG. 3, coaxially of the coupling member, the trunnion, pipe 65 and the bore 75. The remote ends of passages 47 and 48 are closed by plugs 49 and 50. The blocks 51 has a free sliding fit in the central hole in the member 11, and is secured therein by bolts 52 which pass through its outward (leftward in FIG. 2) end flange. The midportion of block 51 is sealed hydraulically by O-rings 55 in spaced annular grooves 56 between which a central annular groove 53 communicates with radial passage 48 in the member 11 and communicates through radial ports 63 with the axial passage 54 in the block 51; the latter leading to and threadably receiving and joining the leftward, as viewed, end of the pipe 65.

Pipe 65 comprises a plurality of sections 66 and 67 removably joined by a pipe coupling 68 which facilitates insertion and withdrawal of the pipe when and where the space between coupling members 11 and 12 is less than the whole length of the assembled sections of the pipe.

Figure 4:
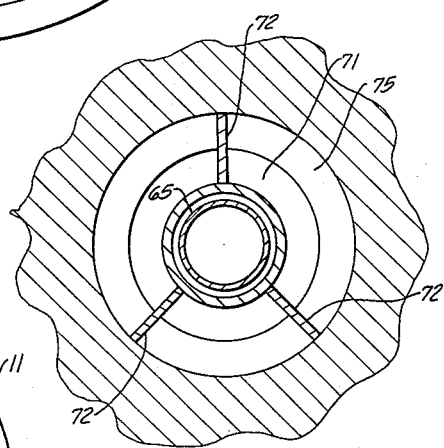
FIGURE 4 is a cross-sectional view of the conical guide in the central part of the trunnion member taken along line 4—4 of FIG. 2.

The pipe 65 is supported centrally in the bore 75 by a plurality of conically shaped guides 71 which open leftwardly to receive the pipe upon its insertion into the bore. The guides 71 are supported by a few spaced radial braces 72, FIGS. 2 and 4. Inlet pipe 65 is slideable and insertable axially through guides 71; the opening in the leftward guide being large enough to allow pipe coupling 68 to pass freely therethrough. The rightward guide in this illustration of my invention has the function of centering the opening outlet end 70 of the pipe 65 in the bore 75 near the inner end thereof to tend to distribute the cool cooling fluid equitably for its return through the bore and for its more uniform acquisition of heat from all parts of the trunnion.

Heated cooling fluid is carried away from the bore 75 at its outer, leftward as viewed, end by way of drilled passages 85 and 86 in the coupling member which connect the bore to the groove 38 in the ring 31 and thence to the outlet and discharge pipe 41 which is tapped into the ring adjacent the groove, FIGS. 1 and 2. An O-ring 79 seals an annular extension 78 of the trunnion in relation to a central depression 77 in the coupling member and prevents leakage of cooling fluid into or between the main centering and driving surfaces 21–23 of the trunnion and coupling.

One advantage of my invention is the facility of insertion and removal of inlet pipe 65 into and from trunnion T without having to remove the coupling member 11 from the trunnion. After the middle great coupling member 13 is removed from coupling members 11 and 12, block 51 becomes accessible between spades 15, FIG. 3. Bolts 52 may be removed and a handle or screw eye 60, FIG. 2, may then be screwed into the threaded hole 59. The block and pipe may then be withdrawn by exerting leftward force on and through the handle 60 to the extent permitted by the proximity of the coupling member 12. Before the block reaches the member 12 the pipe coupling 68 will have become accessible near and between the spades 15 whereby the section 66 may be detached from the section 67 and the latter then freely withdrawn. These steps in reverse order facilitate insertion of the pipe 65 and block 51 into the trunnion and coupling and being secured therein as shown in FIG. 2.

Figure 6:
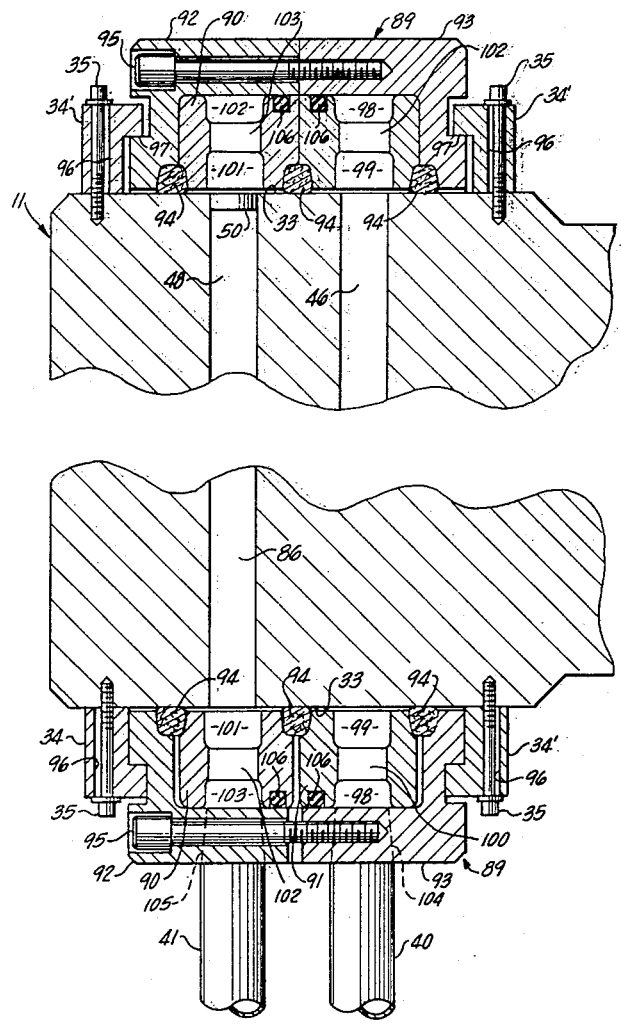
FIGURE 6 is a fragmentary view corresponding to the similar part of FIG. 2, and shows a modified form of my invention in a used condition in the upper part of the figure and in a new and unworn condition in the lower part of the figure.

In a modified form of my invention shown in FIG. 6, I have replaced the ring 31 with two inner rings 90 and 91, preferably made of bronze, and two enveloping, coaxial rings comprising packing clamps 92 and 93. These inner rings and packing clamps are centered about the axis of and supported on the smooth, cylindrical surface 33 of coupling member, by three packing rings 94, which replace the O-ring seals 42 of the first described form of my invention. The packing rings 94 are preferably made of asbestos impregnated with graphite or other lubricant to make them self-lubricating and to insure that the fluid conducting assembly 89 of rings 90 and 91 and the packing clamps 92 and 93 will be easily slidable with respect to surface 33 of coupling member 11 as the coupling rotates. The inner rings 90 and 91, the packing clamps 92 and 93, and the packing rings 94 are all designed to remain stationary while the coupling member 11 rotates.

This unique clamping construction extends the useful life of the packing rings 94. When new packing rings are installed, as shown on the lower part of FIG. 6, packing clamps 92 and 93 are spaced apart and urged together by bolts 95. Once the new packing rings 94 are in place, the packing clamps 92 and 93 are tightened by means of bolts 95, so that the packing rings 94 are squeezed, and protrude from between the inner bronze rings 90–91 and the packing clamps to make gliding contact with surface 33 of coupling member 11. Retaining rings 34' in this modified form of my invention have enlarged holes 96 to permit a slight lateral adjustment of these rings, which in turn give to packing clamps 92 and 93 a greater range of adjustment. As in the first described form of my invention, rings 34' are attached securely to coupling member 11 by bolts 35. When the packing rings 94 become worn as shown in the top part of FIG. 6, the packing clamps 92 and 93 may be tightened by bolt 95. This tightening will again compress the packing rings 94 laterally and force them to protrude inwardly against surface 33, maintaining or restoring the best functioning of the packing rings. The retaining rings 34' may be adjusted laterally, from time to time, towards each other, enlarged holes 96 aiding the same, so that the retaining rings maintain guiding contact at 97 with the packing clamps 92 and 93.

Inner bronze ring 91 carries the inlet fluid by means of outer channel 98 extending around the outer circumference of ring 91 and communicating with the inlet pipe 40, through passage 104 in packing ring 93. Channel 98 also communicates with inner channel 99 therein on the inner circumference of ring 91 by means of holes 100 spaced circumferentially at equal intervals around ring 91 to insure free flow of cooling fluid from channel 98 to channel 99. The fluid flows from channel 99 into passage 46 in coupling member 11, as in my preferred form, FIGURE 2. Inner brass ring 90 has the same design. The outlet fluid flows from passage 86, see also FIGURE 2, into inner circumferential channel 101, channel 103, and then through passage 105 in packing ring 92 to outlet pipe 41. O-ring seals 106 prevent communication of fluid between channels 98 and 103, and prevent the leakage of fluid to the external surfaces of packing clamps 92 and 93.

The packing rings 94 serve as seals which prevent the incoming cold water flowing through the inner bronze ring 91 from mixing with the heated water flowing out through inner bronze ring 90. The sealing action of these rings also prevents the water in either inner bronze ring from escaping from the fluid conducting assembly 89 along the interface between surface 33 of coupling member 11 and the packing clamps 92 and 93. In addition to sealing, these graphite impregnated asbestos rings 94 also lubricate the surface 33 of coupling member 11, allowing the coupling member 11 to rotate freely within the surrounding stationary fluid conducting assembly 89. Still another function of the packing rings 94 is to center the fluid conducting assembly 89 about the axis of rotation of coupling member 11. This alignment further insures a continuous, smooth leak-proof rotation of surface 33 relative to the fluid conducting assembly 89.

While I have illustrated and described preferred forms of my invention, changes and improvements will occur to those skilled in the art who come to understand and enjoy my invention, and therefore, I do not care to be limited in the scope of my patent to the form herein specifically illustrated and described nor in any other way inconsistent with the progress by which my invention has promoted the art.

I claim:

1. A cooling system for a tiltable converter trunnion member having a central bore with an outward end remote from the said converter and having a coupling member in driving engagement with said trunnion and overlying the outward end of said bore and overlying the end of said trunnion member remote from the converter, the coupling member having an interior opening adjacent the outward end of said bore; said system comprising
    ring means with inlet and outlet channels for cooling fluid and slidably mounted on the outside of said coupling member,
    annular seals coacting with said ring means and coupling member and segregating said channels,
    a closure for said bore proximate the outward end of said bore and having inlet and outlet fluid passages communicating with said bore,
    fluid conducting means connecting said inlet and outlet channels with said inlet and outlet passages respectively, and
    inlet and outlet pipes connected to said ring means for conducting fluid to and from said inlet and outlet channels respectively.

2. The system of claim 1 wherein said coupling members has a smooth right cylindrical surface juxtaposed to said ring means and slidably engaging said seals, said seals having a low coefficient of friction when wetted by the cooling fluid, and said ring means has a substantial clearance from said cylindrical surface and said seals tend to center and support the ring on said coupling.

3. A cooling system for a tiltable converter trunnion member having a central bore with an outward end remote from the said converter and having a coupling member in driving engagement with said trunnion and overlying the outward end of said bore and overlying the end of said trunnion member remote from the converter, the coupling member having an interior opening adjacent the outward end of said bore; said system comprising
    ring means having inlet and outlet channels for cooling fluid opening radially inwardly, said ring means being slidably mounted on the outside of said coupling member and held against rotation therewith,
    annular seals coacting with said ring means and coupling member and segregating said channels axially,
    a closure for said bore carried by one of said members proximate the outward end of said bore and having inlet and outlet fluid passages communicating with said bore, fluid conducting means within said coupling member connecting said inlet and outlet channels with said inlet and outlet passages respectively,
    and inlet and outlet pipes connected to said ring means for conducting fluid to and from said inlet and outlet channels respectively.

4. The system of claim 3 wherein said fluid conducting means comprise fluid passages in said coupling member leading to and from said outlet and inlet channels respectively, and said system comprises means restraining said ring means and said channels in said ring means from substantial axial displacement relative to the passages in the coupling member.

5. A cooling system for a tiltable converter trunnion having a central bore with an outward end remote from the said converter and having a coupling member in driving engagement with said trunnion and overlying the outward end of said bore and overlying the end of said trunnion member remote from the converter, the coupling member having an interior opening adjacent the outward end of said bore; said system comprising
    a fluid conducting assembly slidably mounted on the outside of said coupling member and having substantial clearance from said coupling member and adapted to be held against rotation therewith, said assembly comprising two inner rings and two outer rings, each of said inner rings having an inwardly facing annular channel,
    annular seals of a compressible packing material having an outwardly tapered axial thickness and coacting with said fluid conducting assembly and said coupling member, said seals interposed between each of said inner rings and between said inner rings and said outer rings and segregating said inwardly facing channels axially, and centering and supporting the fluid conducting assembly on the coupling member, said outer rings being movable toward each other axially to squeeze said seals.
    means to tighten said outer rings against said annular seals and said inner rings and to compress said outwardly tapered annular seals to cause them to bulge toward said coupling member, said system also comprising
    a closure for said bore proximate the outward end of said bore and having inlet and outlet fluid passages communicating with said bore,
    fluid conducting means within said coupling member connecting said inlet and outlet channels of said inner rings with said inlet and outlet passages respectively,
    and means for conducting fluid to and from said inlet and outlet channels respectively for holding said assembly against rotation with said coupling member.

6. The system of claim 5 wherein said coupling member has a smooth right circular cylindrical surface juxtaposed to said fluid conducting assembly and slidably engaging said annular seals, and said annular seals are impregnated with a lubricant to give said seals a low coefficient of friction and maintain a free sliding contact between said seals and said smooth cylindrical surface.

7. The system of claim 6 wherein said fluid conducting means comprises fluid passages in said coupling member leading to and from said outlet and inlet channels respectively, and said system comprises means restraining said fluid conducting assembly and said channels in the inner rings of the fluid conducting assembly from substantial axial displacement relative to the said passages in the coupling member.

8. A cooling system for a tiltable converter trunnion having a central bore with an open end and having a coupling connected to said trunnion and covering the end of said trunnion and the said open end of the bore, said system comprising, means in said bore for conducting cooling fluid longitudinally therein, slip ring means having annular inlet and outlet channels for cooling fluid slidably mounted on the outside of said coupling and means for holding said slip ring means against rotation with said coupling, annular seals coacting with said slip ring means and coupling and making sliding leak-proof contact therebetween and segregating said channels, said coupling having an open interior and having passageways extending from said interior to said channels, a removable block closing said open interior and having passages connecting said passageways with said conducting means in said bore, and external inlet and outlet pipes connected to said ring and communicating with said channels respectively.

References Cited in the file of this patent
UNITED STATES PATENTS

| | | |
|---|---|---|
| 1,439,491 | Stehli | Dec. 19, 1922 |
| 2,976,087 | Cherubim | Mar. 21, 1961 |